United States Patent [19]

Higham

[11] Patent Number: 4,798,054
[45] Date of Patent: Jan. 17, 1989

[54] LINEAR DRIVE MOTOR WITH FLEXURE BEARING SUPPORT

[75] Inventor: Graham J. Higham, Ashland, Mass.

[73] Assignee: Helix Technology Corporation, Waltham, Mass.

[21] Appl. No.: 106,428

[22] Filed: Oct. 8, 1987

[51] Int. Cl.[4] .............................. F25B 9/00
[52] U.S. Cl. ............................. 62/6; 60/520
[58] Field of Search ..................... 62/6; 60/520

[56] References Cited

U.S. PATENT DOCUMENTS

| | | | |
|---|---|---|---|
| 4,475,346 | 10/1984 | Young et al. | 62/6 |
| 4,545,209 | 10/1985 | Young | 62/6 |
| 4,553,398 | 11/1985 | Young | 62/6 |
| 4,578,956 | 4/1986 | Young | 62/6 |
| 4,644,851 | 2/1987 | Young | 92/127 |

Primary Examiner—Ronald C. Capossela
Attorney, Agent, or Firm—Hamilton, Brook, Smith & Reynolds

[57] ABSTRACT

A linear drive motor of a cryogenic refrigerator, where a reciprocating armature which alternately compresses and expands a gaseous fluid in a thermodynamic cycle, is supported at both ends by flexure supports. The armature has a clearance seal with a stationary piston attached at one end to the armature housing by a flexible stem to minimize cross-bearing loads between the armature and the stationary piston along the clearance seal.

8 Claims, 3 Drawing Sheets

LINEAR DRIVE MOTOR WITH FLEXURE BEARING SUPPORT

RELATED U.S. APPLICATION

"Linear Motor Compressor With Stationary Piston" filed on Oct. 8, 1987, by Graham Higham, Gerald Pruitt, Ronald Morris, Frank Heger, James Livingstone, and David Tormey corresponding to U.S. Ser. No. 106,549; and "Linear Drive Motor With Improved Dynamic Absorber" filed on Oct. 8, 1987, by Graham Higham and corresponding to U.S. Ser. No. 106,630.

BACKGROUND OF THE INVENTION

This invention relates to cryogenic refrigerators such as split Stirling cryogenic refrigerators. In particular, it relates to small refrigeration systems having compressors driven by linear motors.

Conventional split Stirling refrigerators usually include a reciprocating compressor and a displacer in a cold finger removed from that compressor. The piston of the compressor is mechanically driven to provide a nearly sinusoidal pressure variation in the pressurized refrigeration gas. The refrigeration gas is usually helium. This pressure variation is transmitted through a supply line to the displacer in the cold finger.

Typically, an electric motor drives the compressor through a crankshaft which is rotatably secured to the compressor. The compressing movement of the compressor causes pressure in the working volume to rise from a minimum pressure to a maximum pressure and, thus, warm the working volume of gas. Heat from the warmed gas is transferred to the environment so that the compression at the warm end of the cold finger is near isothermal. The high pressure creates a pressure differential across the displacer in the cold finger which, when retarding forces are overcome, is free to move within the cold finger. With the movement of the displacer, high pressure working gas at about ambient pressure is forced through a regenerator and into a cold space. The regenerator absorbs heat from the flowing pressurized refrigerant gas and thus reduces the temperature of the gas.

As the compressor piston reverses direction begins to expand the volume of gas in the working space, the high pressure helium in the displacer is cooled even further. It is this cooling in the cold end of the displacer which provides refrigeration for maintaining a time average temperature gradient of over 200 Kelvin over the length of the regenerator.

At some point the decrease in pressure caused by expanding movement of the piston drops sufficiently to overcome retarding forces on the displacer in the cold finger. This causes the displacer to be returned to its starting position. Cold gas from the cold end of the cold finger is driven once again through the regenerator and extracts heat therefrom.

Recently, refrigerators have been proposed and manufactured that depend on linear motors to control the movement of the piston or pistons in the compressor and to control movement of the displacer. The systems use clearance seals between hard ceramic and/or cermet pistons and cylinder liners. An example is disclosed in U.S. Pat. No. 4,545,209, filed by Niels Young on Jan. 17, 1983.

A goal of such linear refrigerators is long life and reduced wear as must be provided for advanced aircraft and spacecraft.

DISCLOSURE OF THE INVENTION

The present invention relates to several improvements in linear drive motors used in compressors of cryogenic refrigerators.

A stationary piston, about which a reciprocating armature moves to compress and expand a gaseous fluid is attached at one end to a housing. The housing hermetically seals the volume in which the armature reciprocates. A clearance seal between the armature and the stationary piston is positioned along a head portion of the piston. This head portion is attached at one end to the housing by a flexible stem which permits the longitudinal axis of the piston head to bend when it is exposed to radial forces. This permits the stationary piston to remain in alignment with the armature along the clearance seal even when the armature motion is slightly skewed off the longitudinal axis of the compressor.

Two supports are provided at opposite ends of the volume in which the armature reciprocates to prevent cross bearing forces exerted along the clearance seal by the armature.

Each support is comprised of a sleeve that is at least partially concentric about one end of the armature throughout the armature cycle. Each sleeve operates to retain the armature along a linear path and insure even loading along the clearance seal. The longitudinal axis of each sleeve is permitted to skew slightly with respect to the compressor axis. However, springs which attach each sleeve to the housing tend to urge the sleeve, and consequently the armature, back into alignment with the compressor axis.

The invention thus uses the spring action within the flexible stem of the piston and within the spring mounted sleeves to reduce uneven load distribution along the clearance seal between the armature and the stationary piston head. This results in a linear drive system having reduced wear and a longer lifetime.

The above, and other features of the invention, including various novel details of construction and combination of parts, will now be more particularly described with reference to the accompanying drawings and pointed out in the claims. It will be understood that the particular linear drive system with flexure bearing support and flexible piston stem embodying the invention is shown by the way of illustration only and not as a limitation of invention. The principle features of this invention may be employed in various embodiments without departing from the scope of the invention.

DETAILED DESCRIPTION OF THE INVENTION

Figure 1:
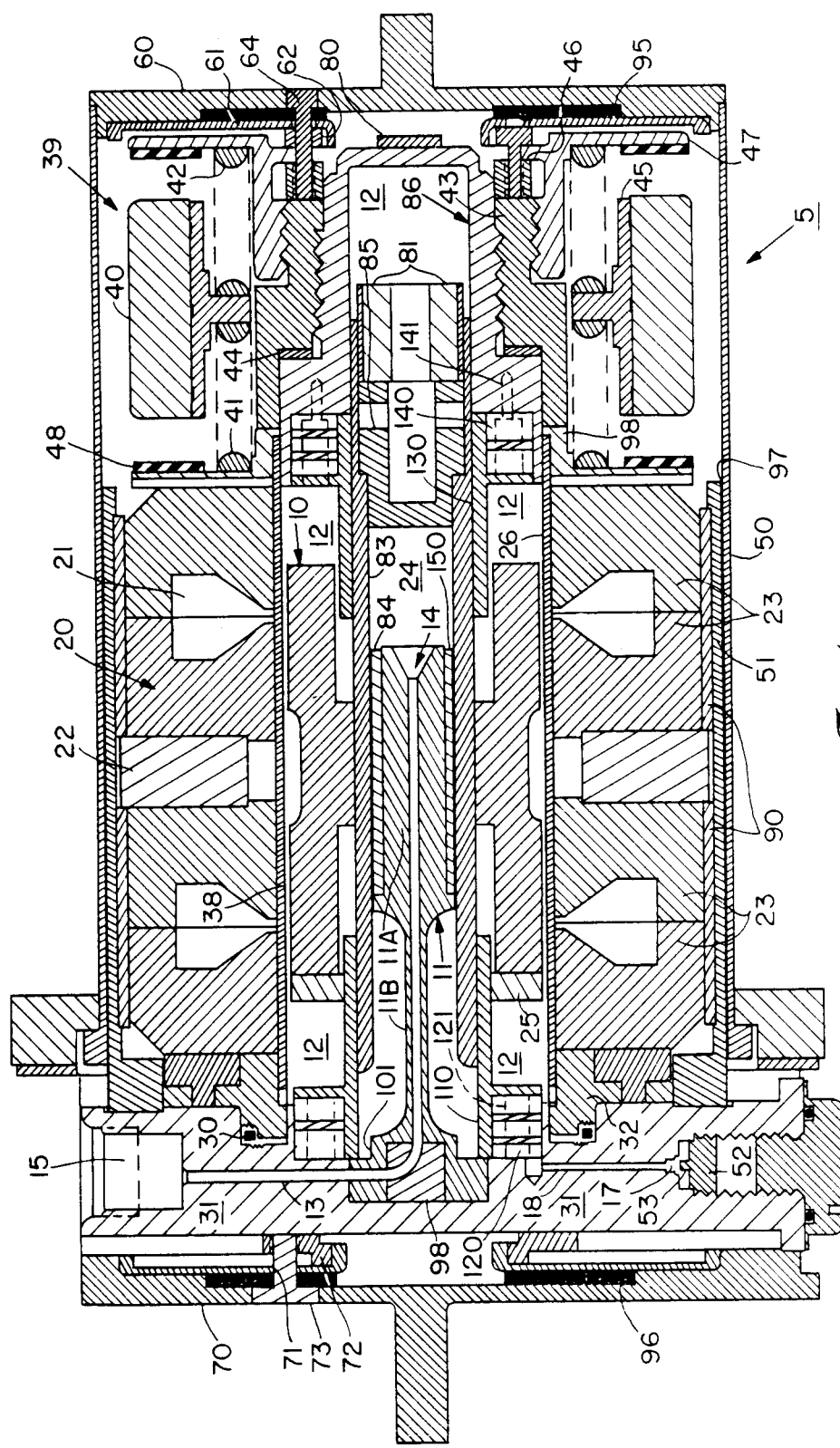
FIG. 1 is a cross-sectional view of a linear drive assembly of a helium cryogenic refrigerator of the present invention.

A linear drive assembly of a helium cryogenic refrigerator utilizing a flexure bearing support and flexible piston stem of the present invention is illustrated in FIG. 1. The linear motor utilizes an involute laminated stator 20 first disclosed in U.S. Pat. No. 4,761,960 of G. Higham et al. filed July 14, 1986 entitled "Cryogenic Refrigeration System Having an Involute Laminated Stator for its Linear Drive Motor."

As shown in FIG. 1, this compressor 5 comprises a reciprocating armature 10 which compresses helium gas in a compression head space 24. From the compression space 24 the gas passes through a port 14 in the stationary piston 11 to pre-formed bores through the piston 11, insert 98, and plate 31 to form conduit 13. Conduit 13 runs along the core of stationary piston 11, then curves at a right angle in insert 98 to a gas fitting assembly 15. From the gas fitting assembly 15, gas is delivered to a cold finger of a cryogenic refrigerator such as a split Stirling refrigerator in which a displacer is housed as disclosed in U.S. Pat. No. 4,545,209. The stationary piston 11 is comprised of a piston head 11A along the length of a clearance seal 150 with the armature 10, and a flexible stem 11B which connects the piston head 11A to the housing plate 31.

Plate 31 provides for a lead ball 53 and retainer screw 52 for sealing the port 17. The compressor is charged with helium gas through the port 17. The gas is allowed to communicate with an armature volume 12 of the piston cylinder through port 16 which is in communication with a second pre-formed conduit 18. During the compressor operation, however, the ball 53 is fixed against the plate 31 by the retainer screw 52 to close the port 17. A protective dust cover screw 19 is provided to prevent dirt and debris from entering the ball 53 and screw 52 seal.

The armature 10 comprises an iron mass 38 fixed to a liner core 83. Iron is used because of its high magnetic permeability and high magnetic induction; however, other materials having the same characteristics may be used. A tungsten alloy ring or other high density, non-magnetic material 25 may be incorporated at one end of the armature to give more mass to adjust the resonant frequency of operation and offset the mass of the target magnet 81 so that the center of gravity of the armature is centrally located. In order to detect the position of the armature a sensor 80 is used to detect the target magnet 81 fitted at one end of the armature 10. The magnet 81 is mounted on a non-magnetic extended cylinder 85 that oscillates within an extension 86 of the armature housing 26 during motor operation. The end plate of cylinder 85 also forms compression space 24 in conjunction with cylinder 82. By isolating the magnet 81 and sensor 80 away from the stator 20, the magnetic field of magnet 80 is decoupled from the magnetic field of the stator magnet 22. Preferably, the armature 10 is fitted with a ceramic cylinder 83 to provide a clearance seal with the stationary piston 11. A cermet material 84 is mounted on the piston 11 to form part of the clearance seal.

Surrounding the armature 10 just described is a pressure housing 26. The size of the pressure housing is constructed to allow helium gas in the working volume 12 to flow freely between the pressure housing 26 and the iron mass 38 as the armature 10 shuttles back and forth.

A stator 20 is located around the perimeter of the pressure housing 26. The stator 20 comprises two coils 21 positioned between involute laminations 23 and separated by a magnet 22. This static assembly is further described in U.S. Pat. No. 4,761,960 by G. Higham et al. recited above, which is incorporated herein. Two shields 90 have been concentrically disposed about the involuted laminations 23 to convey the magnetic flux lines along the inside wall 51 of the housing 50.

As a consequence of the armature 10 reciprocating back and forth, mechanical vibrations are produced by the compressor 5. To eliminate the vibrations, a passive vibration absorber or dynamic absorber 39 is attached to one end of the compressor and is tuned to resonate at the same frequency as the compressor's operating frequency. Preferably, the dynamic absorber 39 comprises a counterbalance mass 40 mounted with supporting ring 45 between two springs 41 and 42 having small damping characteristics. As a result, the axial motion of the compressor is countered by the axial vibration from the counterbalance mass 40 of the absorber 39. A further description of dynamic absorber operation is found in U.S. Ser. No. 894,777, G. Higham et al. filed Aug. 8, 1986, entitled "A Vibration Isolation System for a Linear Reciprocating Machine."

The present invention utilizes isolators 61 and 71 mounted on the opposite ends of the compressor. The two isolators are comprised of flat spiral springs 61 and 71 which are soft in the axial direction while being very stiff in the radial direction. The outer diameter of the two springs 61 and 71 are attached to the housing end plates 60 and 70 respectively. The springs are mounted onto flanges 62 and 72 and in turn attached to a screw flanges 46 and 72 respectively using bolts 64 and 73. The isolators are mounted on elastomeric material 95 and 96 located at both ends of compressor 5 providing a substantial level of damping to the isolator system. Grease is applied to the wall 51 to help remove heat from the stator 20 while providing damping of internal vibration of the compressor. A soft metallic gasket 30 is configured between the plate 31 and flange 32 to seal the armature volume 12 of the linear drive unit from the external atmosphere.

In FIG. 1, there are two cylindrical sleeves 110 and 130 configured at opposite ends of the armature volume such that the inner core 83 of armature 10 is supported by these sleeves, while the armature reciprocates.

The sleeves 110 and 130 are mounted onto plate 31 and housing extension 86 by two coiled springs 120 and 140 respectively and flanges radially extending from the sleeves.

Figure 3:
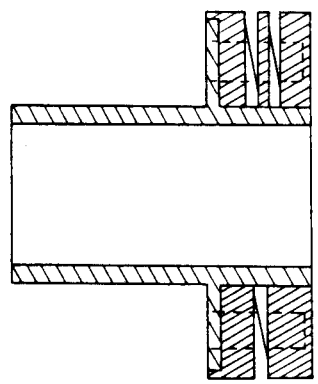
FIG. 3 illustrates a magnified cross-sectional view of a flexure bearing support of the present invention.

FIG. 3 is a magnified cross-sectional view of the sleeve 130 and spring 140.

Figure 4:
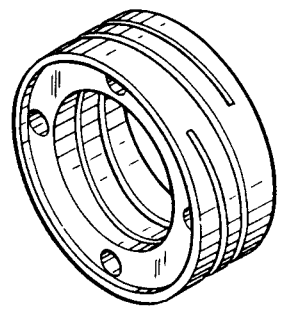
FIG. 4 illustrates a perspective view of the spring of the above flexure bearing support.

FIG. 4 illustrates a perspective view of the spring 140. Bolts 121 and 141 are used to mount the flanges and springs to their respective housing elements. The springs 120 and 140 are flexible to permit a slight skewing of the longitudinal axis of each sleeve 110 and 130. Thus, if the armature is slightly skewed the sleeve supports will tend to realign the armature along the compressor axis.

The flexible stem 11B of the stationary piston 11 works in conjunction with the flange supports to permit the skewing of the armature while maintaining even loading along the clearance seal 150. The stiffness of stem 11B, along with springs 120 and 140 operate to support the armature 10 and maintain proper alignment between the piston 11 and armature 10 to minimize wear along the seal 150.

Figure 2:
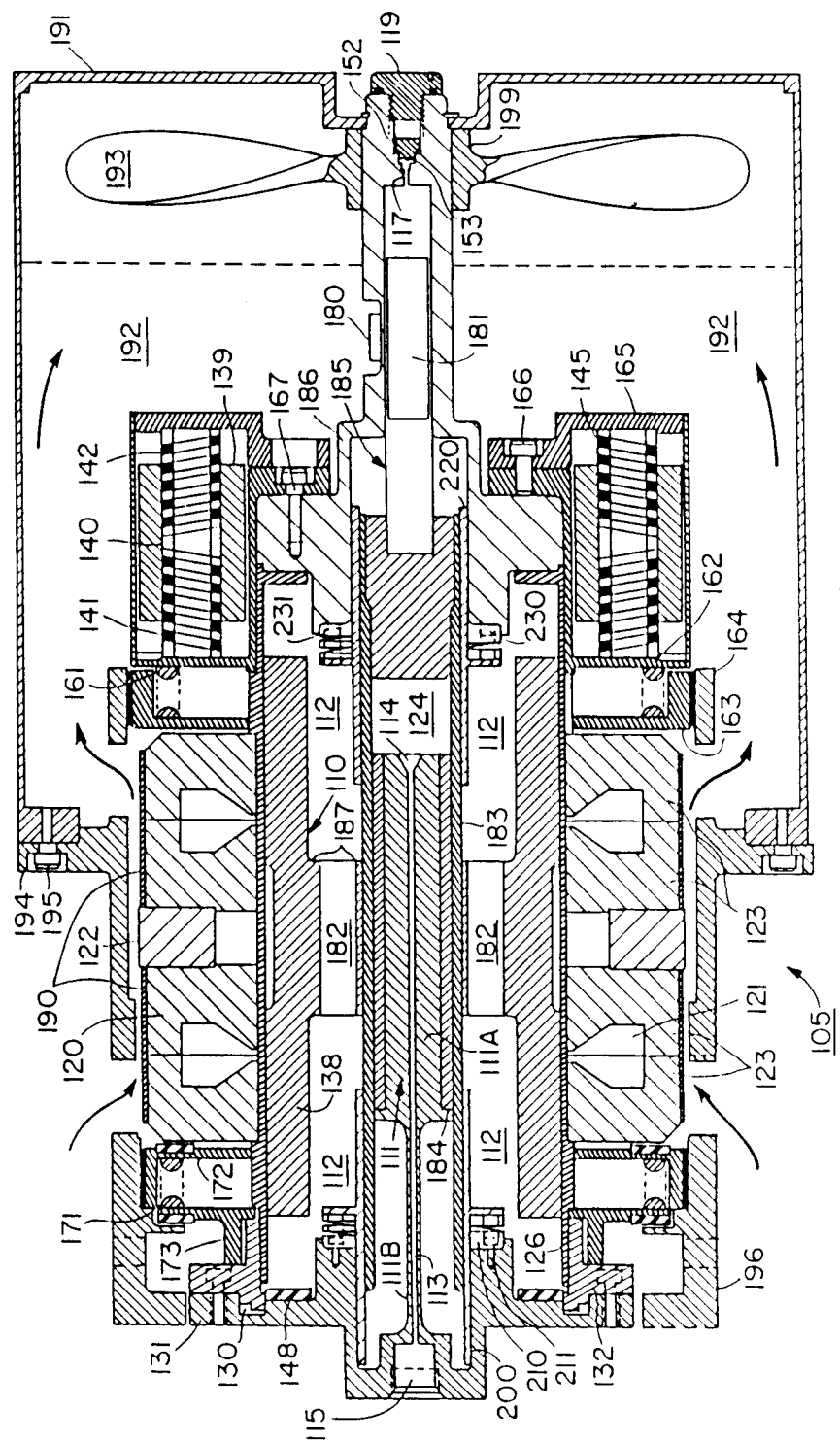
FIG. 2 is a cross-sectional view of a further preferred embodiment of a linear drive assembly of a helium cryogenic refrigerator using a flexible bearing support.

Another preferred embodiment of the invention is shown in the linear drive assembly of FIG. 2.

As shown in FIG. 2, this compressor 105 comprises a reciprocating armature 110 which compresses helium gas in a compression head space 124. From the compression space 124 the gas passes through a port 114 in the stationary piston 111 to pre-formed bores through the piston 111 and plate 131 to form conduit 113. Conduit 113 runs along the core of stationary piston 111 to a gas fitting assembly 115.

The armature housing extension 186 provides for a lead ball 153 and retainer screw 152 for sealing the port 117. The compressor is charged with helium gas through the port 117. During the compressor operation the ball 153 is fixed against the housing portion 186 by the retainer screw 152 to close the port 117. A protective dust cover screw 119 is provided to prevent dirt and debris from entering the ball 153 and screw 152 seal.

As in FIG. 1, the armature 110 of FIG. 2 comprises an iron mass 138 fixed to a liner core 183. A sensor 180 to detect the position of the armature is mounted on the housing extension 186 to detect a target magnet 181 fitted at one end of the armature 110. The magnet 181 is mounted on a non-magnetic extended cylinder 185 that oscillates within an extension 186 of the armature housing 126 during motor operation. By isolating the magnet 181 and sensor 180 away from the stator 120, the magnetic field of magnet 180 is decoupled from the magnetic field of the stator magnet 122. Preferably, the armature 110 is fitted within a ceramic cylinder 183 to provide a clearance seal with the stationary piston 111. A cermet material 184 is mounted on the piston 111 to form part of the clearance seal.

As in the system of FIG. 1, to eliminate the mechanical vibrations of the system, a passive vibration absorber or dynamic absorber 139 is attached to one end of the compressor and is tuned to resonate at the same frequency as the compressor's operating frequency. Preferably, the dynamic absorber 139 comprises a counterbalance mass 140 mounted between two sections 141 and 142 of a single spring 145 having small damping characteristics. The mass 140 is affixed to spring 145 at the center yet permits full compression and extension of the spring sections 141 and 142. As a result, the axial motion of the compressor is countered by the axial vibration from the counterbalance mass 140 of the absorber 139.

The present embodiment utilizes isolators mounted on opposite ends of the compressor. The two isolators are comprised of springs 161 and 171 which are soft in the axial direction while being very stiff in the radial direction. The outer end of the two springs 161 and 171 are attached to the housing flanges 162 and 132 respectively. The inner ends are mounted onto flanges 163 and 172. The isolators are mounted on elastomeric material and located at one end of compressor 105 providing a substantial stator 120 while providing damping of internal vibration of the compressor. A soft metallic gasket 130 is configured between the plate 131 and flange 132 to seal the armature volume 112 of the linear drive unit from the external atmosphere.

The two sleeves 200 and 220 of FIG. 2, along with the springs 210 and 230 operate much the same as the flexure supports of the system in FIG. 1. The flexible stem 111B of the stationary piston 111 works in conjunction with the flange supports 200 and 220, and springs 210 and 230, to minimize wear along the clearance seal.

I claim:

1. A cryogenic refrigerator comprising a gaseous working fluid which is alternately compressed and expanded to cool a portion of the working fluid to cryogenic temperatures by an armature driven by a linear drive motor, the linear drive motor comprising:
   a magnetic armature reciprocating within a volume;
   a housing surrounding the armature that hermetically seals the volume;
   a coil assembly surrounding the housing;
   a stationary piston attached at one end to the housing and forming a compression space with the armature at the other end, such that the armature alternately compresses and expands the fluid in the compression space; and
   support means for supporting the armature at both ends while said armature reciprocates.

2. The cryogenic refrigerator of claim 1 wherein said armature is comprised of a cylinder concentric about the stationary piston and forming a clearance seal therewith, and a permanent magnet attached to said cylinder.

3. The cryogenic refrigerator of claim 2 wherein the support means is comprised of first and second support members disposed at opposite ends of the volume in which the armature reciprocates;
   wherein said first member comprises a support sleeve concentric about a first end of the armature cylinder, and a spring attached on one side to the housing and on the other side to said sleeve; and
   wherein said second support member comprises a second support sleeve concentric about a second end of the armature cylinder, and a second spring attached on one side to the housing and on the other side to said second sleeve.

4. The cryogenic refrigerator of claim 3 wherein the stationary piston is comprised of a cylindrical head along which the clearance seal is disposed, and a flexible stem connecting the head to the housing such that the head can move with respect to the housing o maintain alignment with the armature cylinder.

5. The cryogenic refrigerator of claim 4 wherein the cylindrical head has a larger diameter than the diameter of the flexible stem.

6. A linear drive motor of a cryogenic refrigerator comprising:
   a magnetic armature reciprocating within a volume;
   a housing surrounding the armature that hermetically seals the volume;
   a coil assembly surrounding the housing;
   a stationary piston forming a clearance seal with the armature, and attached at one end to the housing by a flexible stem such that the stationary piston can bend in a radial direction; and
   first and second flexible support members for supporting opposite ends of the armature such that the longitudinal axis of the stationary piston along the clearance seal is aligned with the longitudinal axis of the armature.

7. The linear drive motor of claim 6 wherein said first and second flexible support members are comprised of:
   a flange concentric about one end of the armature and supporting the armature; and
   a spring attached at one end to the flange and at the other end to the housing such that a longitudinal axis of each support member is aligned with the longitudinal axis of the armature.

8. A linear drive motor of a cryogenic refrigerator comprising:
- a magnetic armature reciprocating within a volume;
- a housing surrounding the armature that hermetically seals the volume;
- a coil assembly surrounding the housing;
- a stationary piston forming a clearance seal with the armature, and attached at one end to the housing by a flexible stem such that the stationary piston can bend in a radial direction to maintain alignment of the longitudinal axis of the stationary piston along the clearance seal with the longitudinal axis of the armature.

* * * * *